United States Patent
Hirai

(10) Patent No.: US 7,541,759 B2
(45) Date of Patent: Jun. 2, 2009

(54) PANEL MEMBER CONTROL SYSTEM

(75) Inventor: Kazuyuki Hirai, Kasugai (JP)

(73) Assignee: ASMO CO., Ltd., Shizuoka-pref. (JP)

( * ) Notice: Subject to any disclaimer, the term of this patent is extended or adjusted under 35 U.S.C. 154(b) by 40 days.

(21) Appl. No.: 11/593,570

(22) Filed: Nov. 7, 2006

(65) Prior Publication Data

US 2007/0108929 A1 May 17, 2007

(30) Foreign Application Priority Data

Nov. 11, 2005 (JP) ............................ 2005-327609

(51) Int. Cl.
*E05F 15/16* (2006.01)

(52) U.S. Cl. .................. 318/286; 318/272; 318/282; 318/468; 318/469

(58) Field of Classification Search ......... 318/263–266, 318/280, 286, 466–469, 271, 272, 282, 565, 318/626, 632
See application file for complete search history.

(56) References Cited

U.S. PATENT DOCUMENTS

| | | | | |
|---|---|---|---|---|
| 3,681,661 A | * | 8/1972 | Koegel | 361/72 |
| 5,936,369 A | * | 8/1999 | Iwashita et al. | 318/609 |
| 5,977,732 A | * | 11/1999 | Matsumoto | 318/283 |
| 6,100,658 A | * | 8/2000 | Kume et al. | 318/286 |
| 6,274,947 B1 | * | 8/2001 | Terashima | 307/10.1 |
| 6,335,602 B1 | * | 1/2002 | Kaindl | 318/445 |
| 7,411,364 B2 | * | 8/2008 | Takahashi | 318/286 |
| 2006/0290309 A1 | * | 12/2006 | Saitou et al. | 318/469 |

FOREIGN PATENT DOCUMENTS

| | | |
|---|---|---|
| JP | A-10-169310 | 6/1998 |
| JP | A-2002-096632 | 4/2002 |
| JP | A-2002-250175 | 9/2002 |

* cited by examiner

*Primary Examiner*—Bentsu Ro
(74) *Attorney, Agent, or Firm*—Posz Law Group, PLC

(57) ABSTRACT

A panel member control system for controlling a panel member includes a motor, a rotation detecting means, and a pinching detecting means. The rotation detecting means detects a rotational speed of the motor. The pinching detecting means detects an occurrence of pinching of an object by the panel member when a pinching indicative value exceeds a pinching determination threshold. The pinching detecting means includes a disturbance detecting means and a correcting means. The disturbance detecting means determines whether the motor is in a disturbed state based on a change in the rotational speed. The correcting means corrects the pinching determination threshold in view of a result of the determination made by the disturbance detecting means.

16 Claims, 7 Drawing Sheets

OPENING/CLOSING DOOR

RUNNING ON ROUGH ROAD

PINCHING WHILE RUNNING ON ROUGH ROAD

PANEL MEMBER CONTROL SYSTEM

CROSS REFERENCE TO RELATED APPLICATION

This application is based on and incorporates herein by reference Japanese Patent Application No. 2005-327609 filed on Nov. 11, 2005.

BACKGROUND OF THE INVENTION

1. Field of the Invention

The present invention relates to a panel member control system.

2. Description of Related Art

A device (e.g., a power window device and a sunroof device for a vehicle) for driving an opening/closing member to be opened/closed conventionally performs automatic reverse control on detecting pinching of a foreign object in the opening/closing member. In pinching detection processing of such a device, a variation (e.g., variations in a rotation speed of a drive motor, in a variability rate, and in a movement speed of the opening/closing member), which is caused by the pinching of the foreign object, is calculated. Then, it is determined that the pinching is produced when this variation exceeds a predetermined pinching determination threshold.

Taking the power window device for example, an external load (a disturbance) is applied due to vibration when a vehicle door is opened/closed or while the vehicle is running. Particularly while driving on a rough road, a heavy external load is applied. As in the case of the pinching, the external load prevents a motor from driving a windowpane to be closed, thereby sometimes causing the variation, which results in reduction in the rotation speed of the motor. Accordingly, the power window device has a disadvantage that it operates reversely due to erroneous detection of the pinching during the course of closing the windowpane when the vehicle door is opened/closed or while the vehicle is running.

In order to avoid such erroneous detection, the pinching determination threshold is changed to a larger value to lower a sensitivity to the variation is for a certain amount of time when the disturbance is detected.

For instance, a windowpane control device that is described in JP2002-96632A determines that the pinching is caused when a predetermined period of duration elapses after a decrease in a rotation speed of a power window motor becomes equal to or larger than the pinching determination threshold. A small pinching determination threshold and a short period of duration (i.e., a normal sensitivity) are employed while the vehicle is running on a normal road, whereas a large pinching determination threshold and a long period of duration (i.e., a lowered sensitivity) are employed while the vehicle is running on the rough road.

Generally, the rotation speed of the motor varies according to the vibration and an impact, which result from the vehicle running on the rough road. The windowpane control device in JP2002-96632A determines that the vehicle is running on the rough road when the rotation speed of the motor is increased to such an extent that it is equal to or larger than a predetermined set value, based on the impact that results from the vehicle running on the rough road.

Furthermore, while the vehicle is running on the rough road, even if the rotation speed of the motor becomes equal to or smaller than the set value after it exceeds the set value, the pinching determination threshold for the rough road continues to be employed until the certain amount of time elapses.

In this manner, since the windowpane control device in JP2002-96632A employs the large pinching determination threshold and the long period of duration while the vehicle is running on the rough road, the possibility of the erroneous detection of the pinching can be decreased.

As well, a power window system in JP2002-250175A sets the pinching determination threshold by subtracting a correction value that is set according to a predetermined value and a road condition, from an estimate value (an estimated rotation speed) of the rotation speed of the motor, which is calculated from a power supply voltage of the motor. Then, the power window system operates reversely on detecting the pinching when an actual measurement value of the rotation speed of the motor is below the pinching determination threshold.

In this manner, because the power window system in JP2002-250175A corrects the pinching determination threshold using the correction value that is properly set according to the road condition while the vehicle is running on the rough road, the possibility of the erroneous detection of the pinching can be decreased.

Nevertheless, in the windowpane control device in JP2002-96632A, if the period of duration, which is used for determining the pinching while the vehicle is running on the rough road, is set at a relatively large value, there is likely to be a period, during which the pinching cannot be detected immediately after the vehicle runs past the rough road. Also, vibration that lasts longer than the period of duration is likely to be erroneously determined to be the pinching, if the period of duration is set at a relatively small value. Moreover, there is a disadvantage that a load used for the reverse operation remains large for a while even after the vehicle resumes running on the normal road from the rough road, if the period, during which the pinching determination threshold for the rough road is continuously employed, is set at a relatively large value.

Besides, although the power window system in JP2002-250175A properly changes the correction value according to a variation in the road condition, the pinching determination threshold does not change so as to follow a variation in the actual measurement value of the rotation speed of the motor. Hence, there is a disadvantage that the load used for the reverse operation needs to be set at a relatively large value in order to avoid an erroneous determination.

SUMMARY OF THE INVENTION

The present invention addresses the above disadvantages. Thus, it is an objective to provide a panel member control system, which can limit erroneous detection of pinching due to a relatively small normal disturbance that is caused while a vehicle is running and a relatively large disturbance that is caused while the vehicle is running on a rough road, and which can restrict a pinch load to a relatively small value.

To achieve the objective of the present invention, there is provided a panel member control system for controlling a panel member that is driven in an opening direction to open an opening of an opening defining member and is driven in a closing direction to close the opening of the opening defining member. The panel member control system includes a motor, a rotation detecting means, and a pinching detecting means. The motor rotates in a first rotational direction in a first driven state to drive the panel member in the opening direction and rotates in a second rotational direction in a second driven state to drive the panel member in the closing direction. The rotation detecting means detects a rotational speed of the motor. The pinching detecting means detects an occurrence of pinching of an object by the panel member when a pinching indicative value, which is obtained based on the rotational speed of the motor detected by the rotation detecting means at the time of driving the motor in the second driven state, exceeds a pinching determination threshold. The pinching detecting means includes a disturbance detecting means and a correcting means. The disturbance detecting means determines whether the motor is in a disturbed state based on a change in the rotational speed of the motor, which is detected by the rotation detecting means during a period of acceleration of the rotational speed of the motor in the second driven state. The correcting means corrects the pinching determination threshold in view of a result of the determination made by the disturbance detecting means. The correcting means corrects the pinching determination threshold based on the rotational speed of the motor, which is detected by the rotation detecting means at a beginning of subsequent acceleration of the rotational speed of the motor in the second driven state after the result of the determination indicates that the motor is in the disturbed state.

To achieve the objective of the present invention, there is also provided a panel member control system for controlling a panel member that is driven in an opening direction to open an opening of an opening defining member and is driven in a closing direction to close the opening of the opening defining member. The panel member control system includes a motor, a rotation detecting means, and a pinching detecting means. The motor rotates in a first rotational direction in a first driven state to drive the panel member in the opening direction and rotates in a second rotational direction in a second driven state to drive the panel member in the closing direction. The rotation detecting means detects a rotational speed of the motor. The pinching detecting means detects an occurrence of pinching of an object by the panel member when a pinching indicative value, which is obtained based on the rotational speed of the motor detected by the rotation detecting means at the time of driving the motor in the second driven state, exceeds a pinching determination threshold. The pinching detecting means includes a disturbance detecting means and a correcting means. The disturbance detecting means determines whether the motor is in a disturbed state. The disturbance detecting means determines that the motor is in the disturbed state when an acceleration count value exceeds a predetermined value. The acceleration count value is incremented during a period of acceleration of the rotational speed of the motor in the second driven state. The acceleration count value is decremented during a period of deceleration of the rotational speed of the motor in the second driven state. The correcting means corrects the pinching determination threshold in view of a result of the determination made by the disturbance detecting means.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

With reference to drawings, an embodiment of the present invention will be described below. In addition, it is apparent that configurations, procedures and the like, which will be described below, do not by any means limit the present invention, and that they can be changed in various ways without departing from the scope of the present invention.

Figure 1:
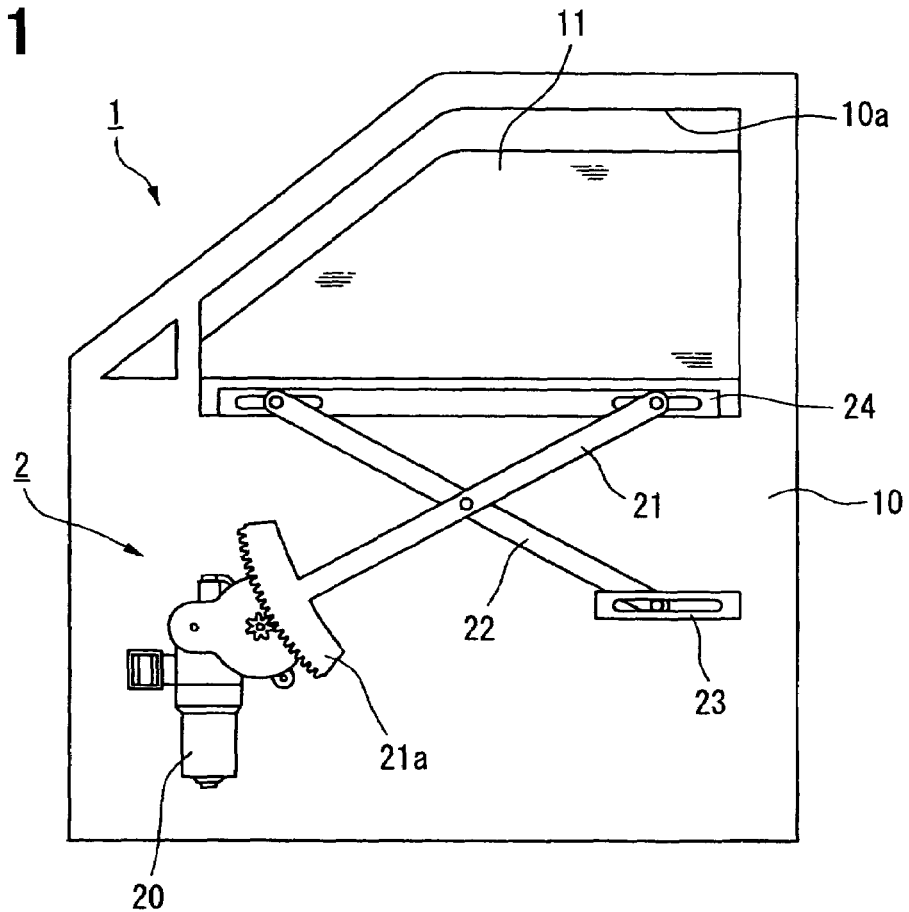
FIG. 1 is a schematic diagram illustrating a power window device according to an embodiment of the present invention.
Figure 2:
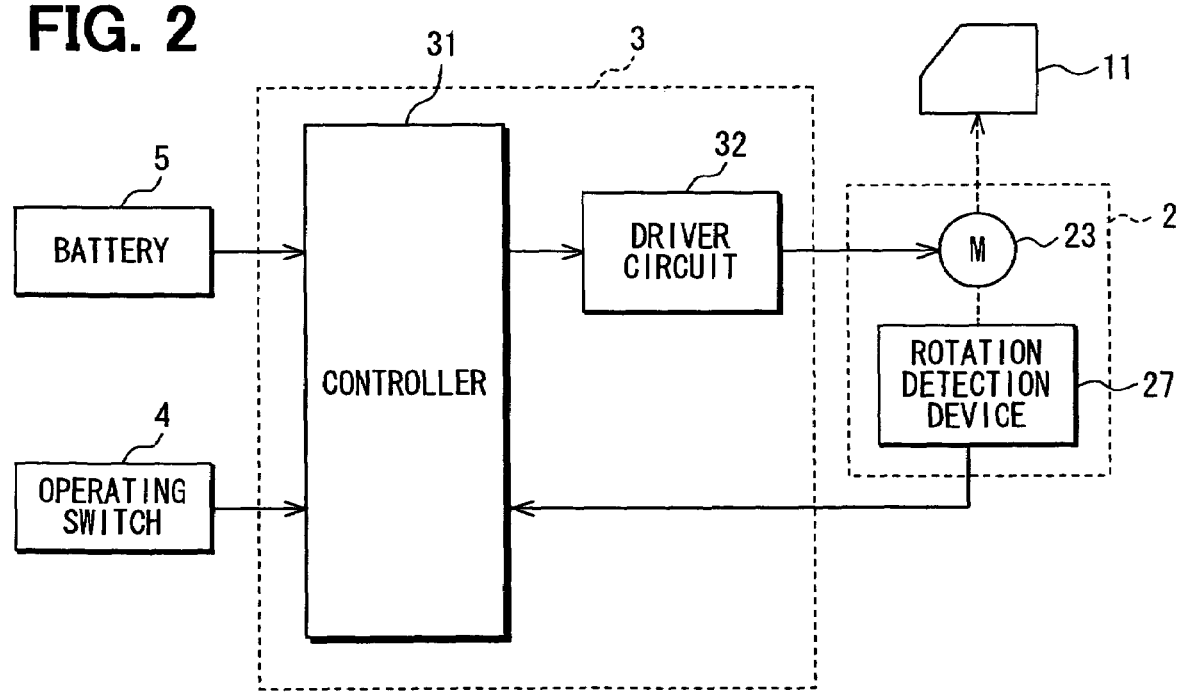
FIG. 2 is a block diagram of a power window device in FIG. 1.
Figure 4A:
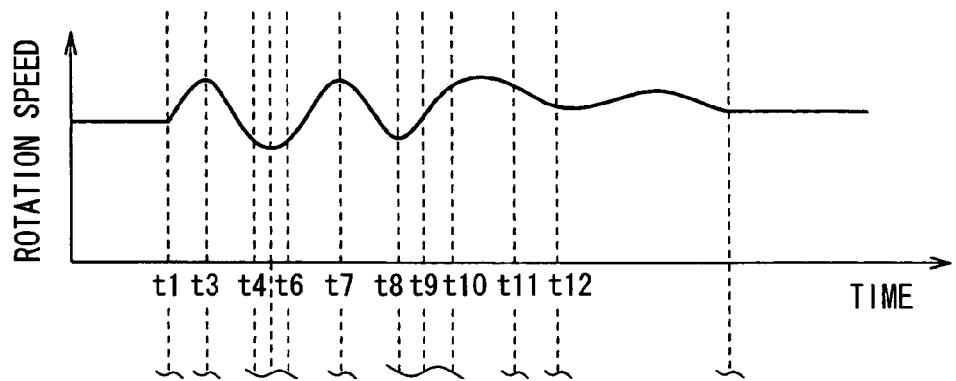
FIG. 4A is a diagram illustrating pinching determination processing in running on a rough road.
Figure 4B:
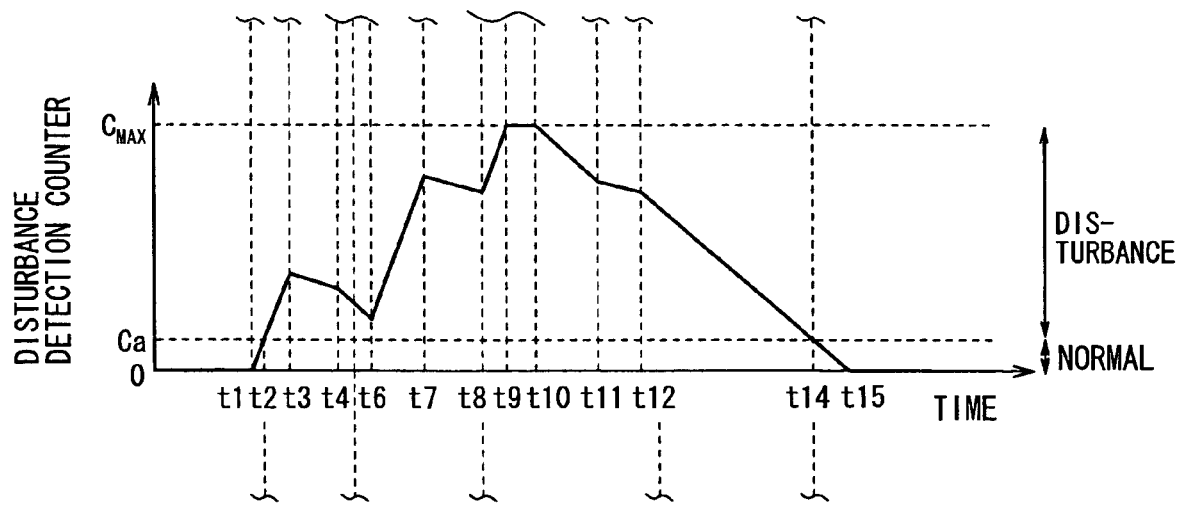
FIG. 4B is a diagram illustrating the pinching determination processing in running on the rough road.
Figure 4C:
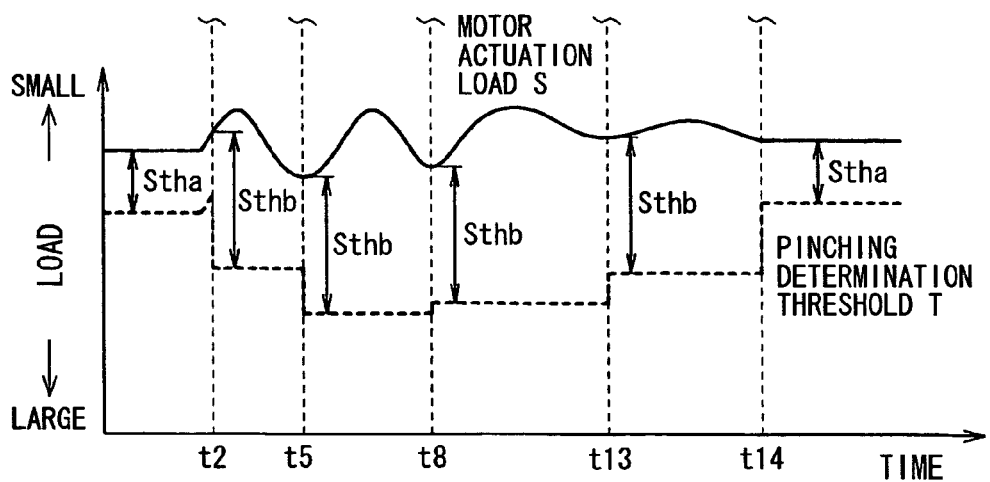
FIG. 4C is a diagram illustrating the pinching determination processing in running on the rough road.
Figure 5A:
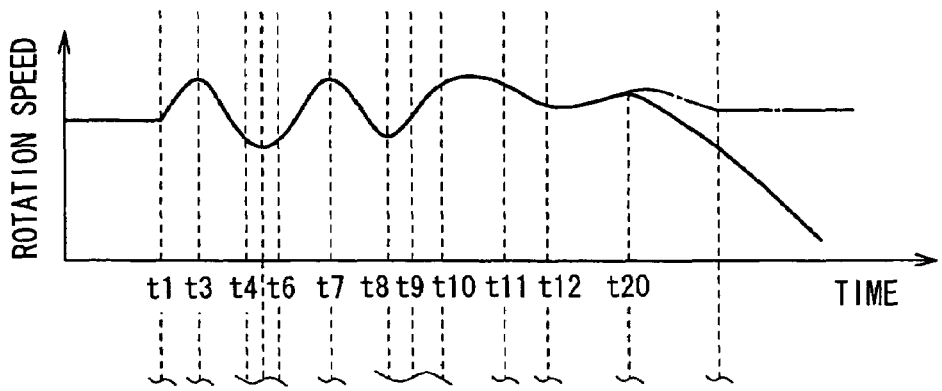
FIG. 5A is a diagram illustrating pinching determination processing when pinching is caused while a vehicle is running on a rough road.
Figure 5B:
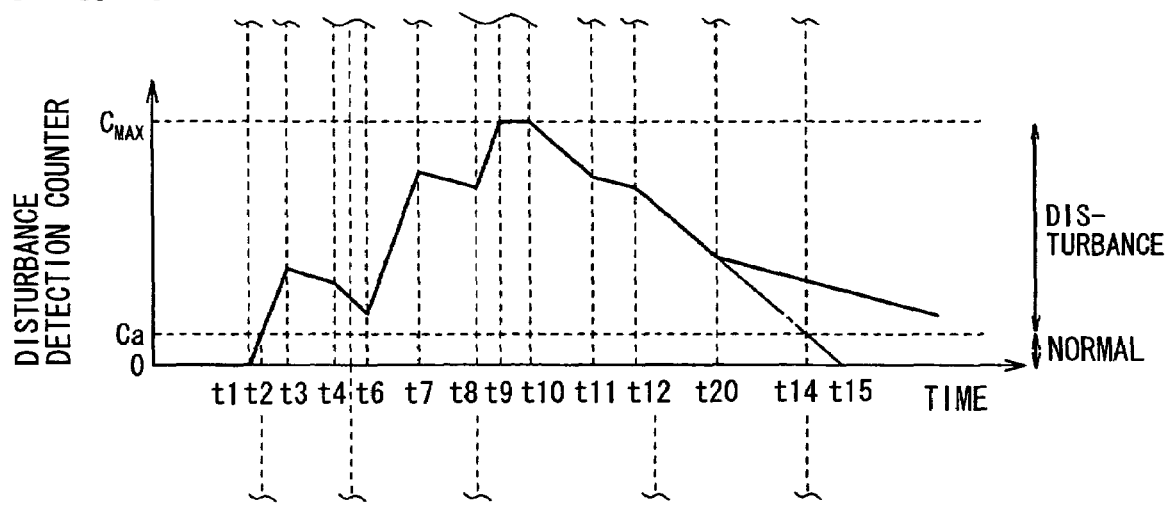
FIG. 5B is a diagram illustrating the pinching determination processing when the pinching is caused while the vehicle is running on the rough road.
Figure 5C:
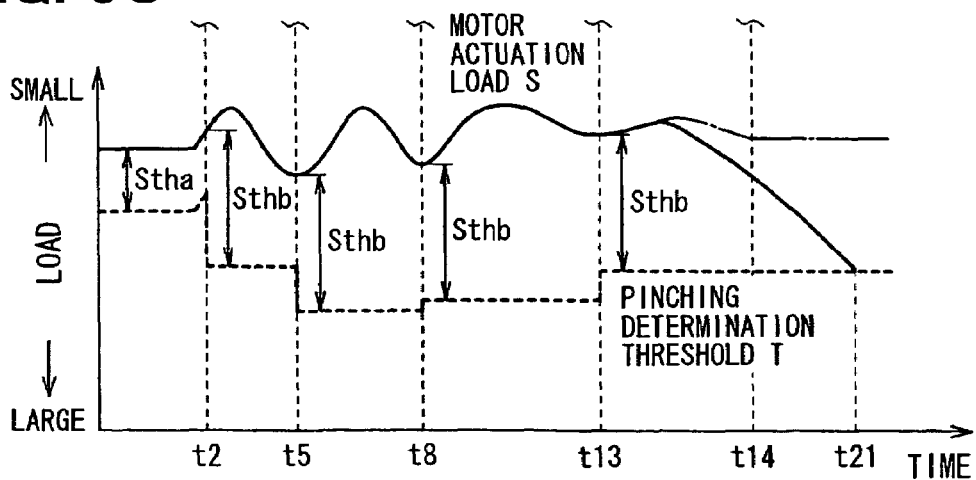
FIG. 5C is a diagram illustrating the pinching determination processing when the pinching is caused while the vehicle is running on the rough road.
Figure 6:
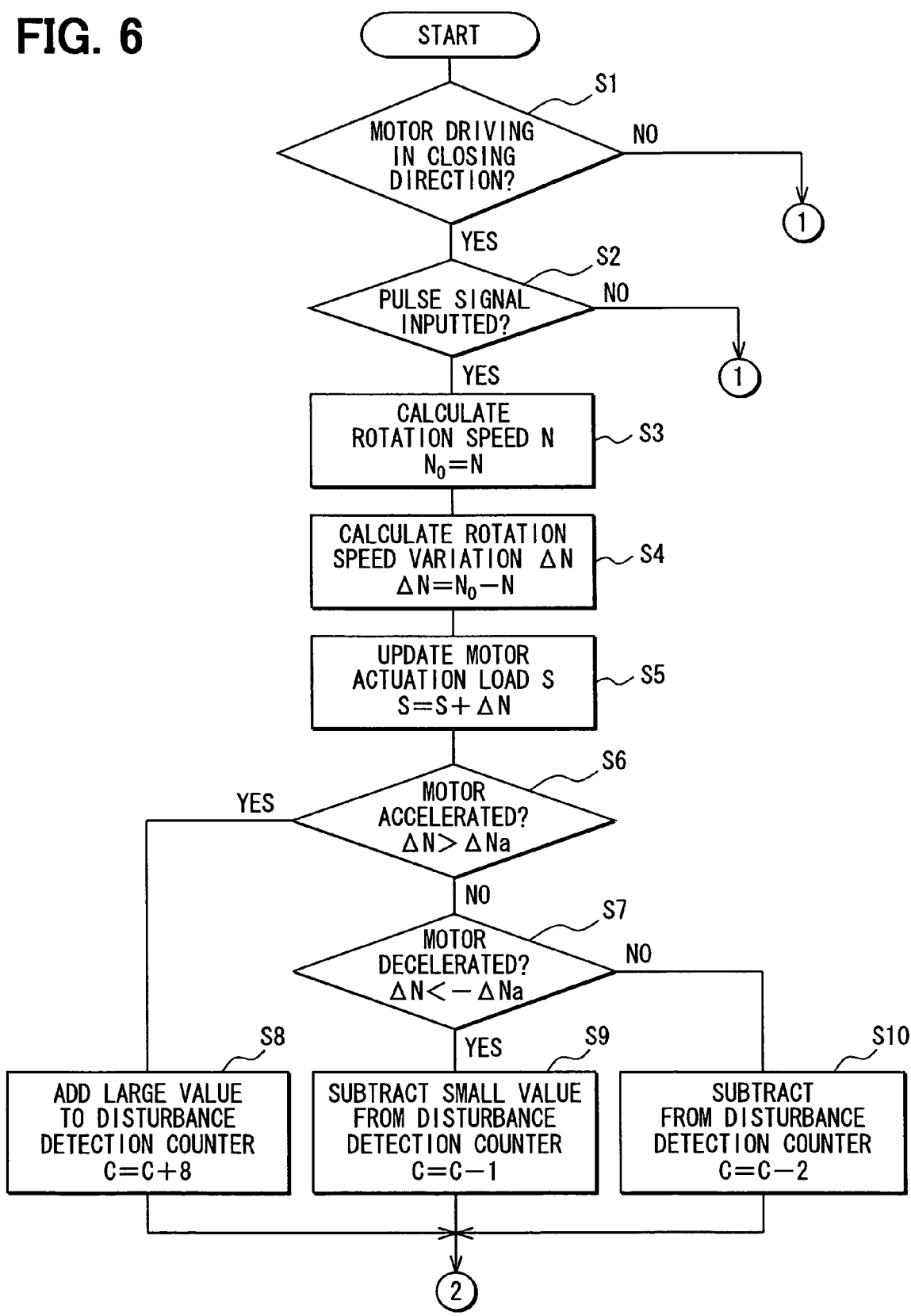
FIG. 6 is a flowchart showing a part of a flow of pinching determination processing.
Figure 7:
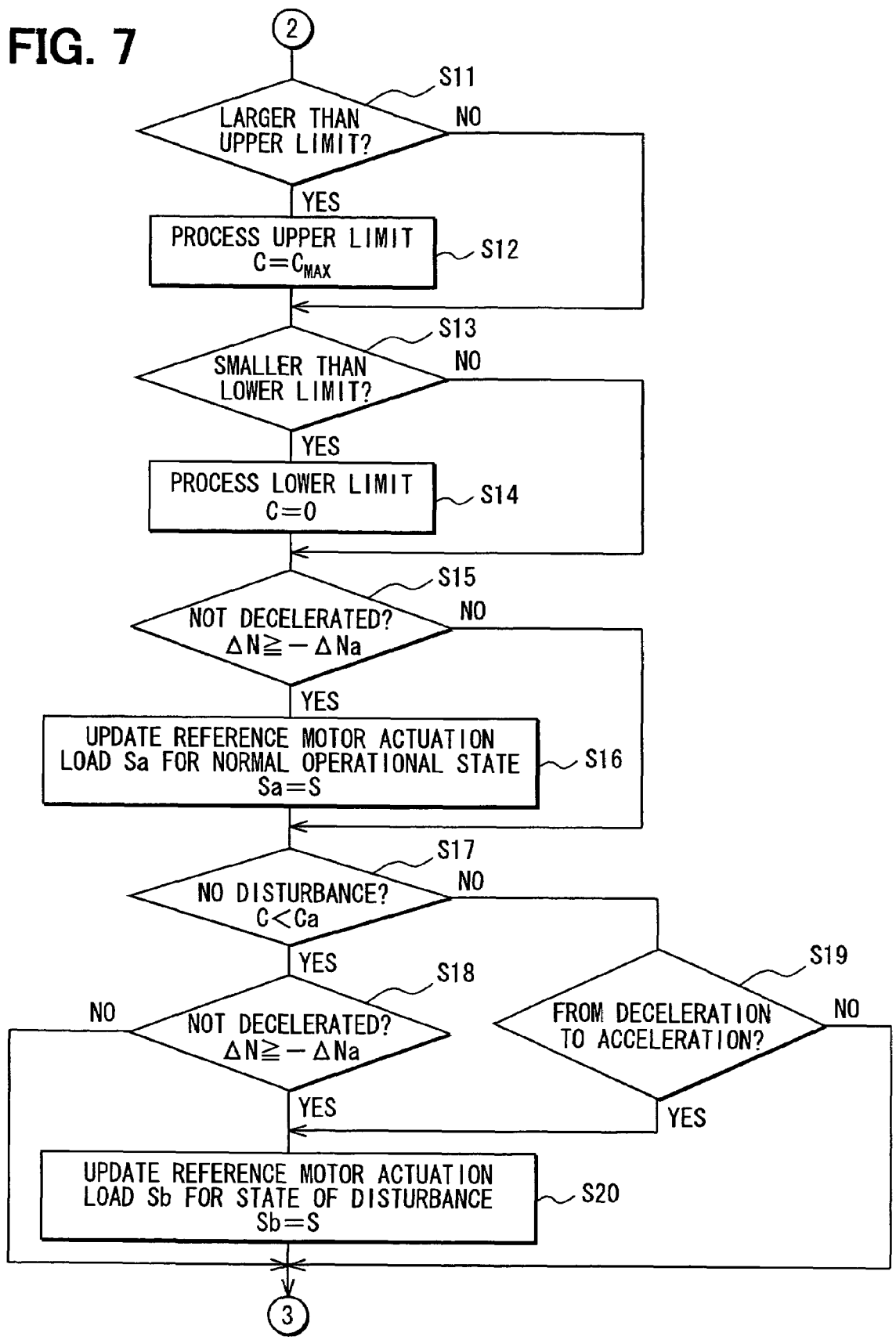
FIG. 7 is a flowchart showing another part of the flow of the pinching determination processing.
Figure 8:
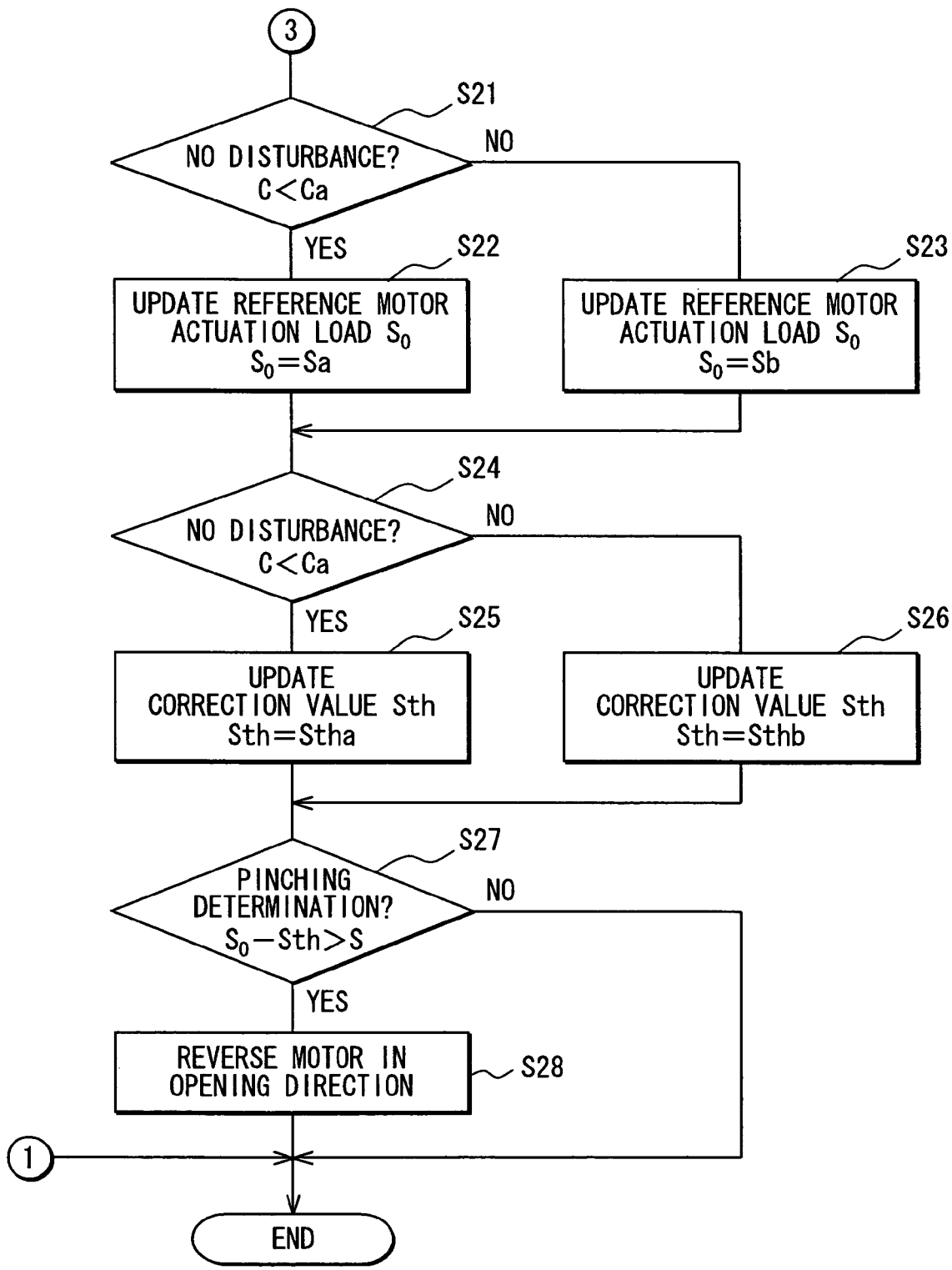
FIG. 8 is a flowchart showing another part of the flow of the pinching determination processing.

FIGS. 1 to 8 relate to the embodiment of the present invention. FIG. 1 is a schematic diagram illustrating a power window device. FIG. 2 is a block diagram of the power window device in FIG. 1. FIGS. 3A to 3C are diagrams illustrating pinching determination processing in opening/closing a door of a vehicle. FIGS. 4A to 4C are diagrams illustrating the pinching determination processing in running on a rough road. FIGS. 5A to 5C are diagrams illustrating the pinching determination processing when pinching is caused while the vehicle is running on the rough road. FIGS. 6 to 8 are flowcharts showing flows of the pinching determination processing.

The embodiment of the present invention, in which a panel member control system is applied to the power window device, will be described below. FIG. 1 is the schematic diagram illustrating the power window device 1 (hereafter the device 1) of the present embodiment, and FIG. 2 is the block diagram of the device 1 in FIG. 1. The device 1 is provided to move up and down (closes and opens) a windowpane (a panel member) 11 (thereby closing an opening 10a of a door (an opening defining member) 10 and opening the opening 10a of the door 10) as an opening/closing member arranged in the door 10 of the vehicle by a rotary drive of a motor 20. A driving means 2 for opening/closing the windowpane 11, a control means 3 for controlling an operation of the driving means 2, and an operating switch 4 for an occupant to command the operation are main components of the device 1.

In the present embodiment, the windowpane 11 moves up and down along a rail (not shown) between an upper fully closed position and a lower fully open position.

The motor 20 having a speed reducing mechanism secured to the door 10, an elevating arm 21 with a fan-shaped gear 21a driven by the motor 20, a driven arm 22 that is pivoted to cross the elevating arm 21, a fixed channel 23 fixed to the door 10, and a glass-side channel 24 integrated with the windowpane 11 are main components of the driving means 2.

The motor 20 is constructed, such that a rotor rotates forward and reverse as a result of a magnetic attraction effect generated between the rotor and a stator having a magnet by energizing a winding of the rotor after receiving an electric power supply from the control means 3. In the driving means 2, when the elevating and driven arms 21, 22 swing correspondingly to rotation of the motor 20, slidings of their ends are restricted by the channels 24, 23, respectively. Consequently, the elevating and driven arms 21, 22 are driven as an X-link, thereby moving up and down the windowpane 11.

The motor 20 is integrated with a rotation detection device 27. The rotation detection device 27 outputs a pulse signal (a rotation speed signal), which is synchronized with the rotation of the motor 20, to the control means 3. The rotation detection device 27 is configured to detect a magnetic variation of the magnet that rotates with an output shaft of the motor 20 by means of a plurality of Hall elements. That is, the pulse signal is outputted according to each predetermined movement of the windowpane 11 or each predetermined rotation angle of the motor 20. Accordingly, the rotation detection device 27 can output a signal, which is approximately proportional to a rotation speed of the motor 20 and a movement distance of the windowpane 11. Then, the control means 3 calculates the rotation speed of the motor 20 (or a movement speed of the windowpane 11) using the pulse signal from the rotation detection device 27. In the present embodiment, the rotation detection device 27 and the control means 3 are included in a rotation detecting means.

Additionally, while the Hall elements are employed for the rotation detection device 27 in the present embodiment, an encoder may be employed as long as it can detect the rotation speed of the motor 20. Also, although the motor 20 is integrated with the rotation detection device 27 to detect a rotation speed of the output shaft of the motor 20 or the movement speed of the windowpane 11, the movement speed of the windowpane 11 may be directly detected by other known means, thereby calculating the rotation speed of the motor 20.

The control means 3 includes a controller 31 and a driver circuit 32. The controller 31 and the driver circuit 32 are fed with electric power, which is necessary for their operations, by a battery 5 mounted in the vehicle.

The controller 31 includes a microcomputer that has a CPU, memories such as a ROM and a RAM, an input circuit, an output circuit, and the like. The CPU is connected to the memories, the input circuit, and the output circuit via a bus. Additionally, without being limited to this, the controller 31 may include a DSP or a gate array.

The controller 31 normally rotates the motor 20 forward and reverse through the driver circuit 32 based on an operating signal from the operating switch 4, thereby opening/closing the windowpane 11. Also, the controller 31 can detect the pinching of a foreign object between an upper end of the windowpane 11 and a window frame based on the pulse signal received from the rotation detection device 27. On detecting the pinching of the foreign object, the controller 31 rotates the motor 20 in an opening direction via the driver circuit 32, thereby driving the windowpane 11 to be opened.

The driver circuit 32 includes an IC that has an FET, and reverses polarity of the electric power supply to the motor 20 based on an input signal from the controller 31. That is, the driver circuit 32 feeds the electric power to the motor 20 to rotate the motor 20 in a forward rotating direction when it receives a forward rotation command signal from the controller 31. The driver circuit 32 feeds the electric power to the motor 20 to rotate the motor 20 in a reverse rotating direction when it receives a reverse rotation command signal from the controller 31. In addition, the driver circuit 32 may be configured to reverse the polarity using a relay circuit. As well, the driver circuit 32 may be configured to be incorporated into the controller 31.

The controller 31 detects a rising or descending part (a pulse edge) of the pulse signal that is inputted. The controller 31 detects a rotating direction of the motor 20 based on a phase difference between two adjacent pulse signals, as well as calculating the rotation speed (a rotational period) of the motor 20 based on an interval (a period) between two adjacent pulse edges. In other words, the controller 31 indirectly calculates the movement speed of the windowpane 11 based on the rotation speed (the rotational period) of the motor 20, and identifies a moving direction of the windowpane 11 based on the rotating direction of the motor 20. Besides, the controller 31 counts the pulse edges. This pulse count value is added or subtracted according to an opening/closing movement of the windowpane 11. The controller 31 identifies an opening/closing position of the windowpane 11 by a magnitude of the pulse count value.

Furthermore, as well as calculating a rotation speed $N_0$ according to each pulse signal, the controller 31 calculates difference between a rotation speed $N$ that corresponds to a previous pulse signal and the rotation speed $N_0$ that corresponds to the present pulse signal to calculate a rotation speed variation $\Delta N$ (=$N_0$−$N$). That is, when the windowpane 11 is decelerated in its closing direction, the rotation speed variation $\Delta N$ is a negative quantity (during deceleration: $\Delta N<0$), while the rotation speed variation $\Delta N$ is a positive quantity (during acceleration: $\Delta N>0$) when the windowpane 11 is accelerated in its closing direction. In addition, through grouping several pulse signals together, the rotation speed $N$ and the rotation speed variation $\Delta N$ may be calculated on a group basis to improve processing accuracy and promote stabilization.

The operating switch 4 includes a swing type switch or the like, which allows a two-step operation, and has an opening switch, a closing switch and an automatic switch. By the occupant operating this operating switch 4, a command signal to open/close the windowpane 11 is outputted to the controller 31.

More specifically, when the operating switch 4 is operated toward its one end side by one step, the opening switch is turned on, and the operating switch 4 outputs to the controller 31 a normal opening command signal to perform a normal opening operation (i.e., an opening operation only while operated) on the windowpane 11. Also, when the operating switch 4 is operated toward the other end side by one step, the closing switch is turned on, and the operating switch 4 outputs to the controller 31 a normal closing command signal to perform a normal closing operation (i.e., a closing operation only while operated) on the windowpane 11.

Besides, when the operating switch 4 is operated toward its one end side by two steps, both the opening switch and the automatic switch are turned on, and the operating switch 4 outputs to the controller 31 an automatic opening command signal to perform an automatic opening operation (i.e., the opening operation to the fully open position even after the operation is stopped) on the windowpane 11. Also, when the operating switch 4 is operated toward the other end side by two steps, both the closing switch and the automatic switch are turned on, and the operating switch 4 outputs to the controller 31 an automatic closing command signal to perform an automatic closing operation (i.e., the closing operation to the fully closed position even after the operation is stopped) on the windowpane 11.

The controller 31 performs the normal opening operation on the windowpane 11 by driving the motor 20 through the driver circuit 32 all the while that it is receiving the normal opening command signal from the operating switch 4 (all the while that the operating switch 4 is being operated). On the other hand, the controller 31 performs the normal closing operation on the windowpane 11 by driving the motor 20 through the driver circuit 32 all the while that it is receiving the normal closing command signal from the operating switch 4 (all the while that the operating switch 4 is being operated).

Moreover, when the controller 31 receives the automatic opening command signal from the operating switch 4, it performs the automatic opening operation on the windowpane 11 to the fully open position by driving the motor 20 through the driver circuit 32. On the other hand, when the controller 31 receives the automatic closing command signal from the operating switch 4, it performs the automatic closing operation on the windowpane 11 to the fully closed position by driving the motor 20 through the driver circuit 32.

The controller 31 monitors presence or absence of the pinching by the windowpane 11 while performing the closing operation (i.e., the normal and automatic closing operation) on the windowpane 11. That is, when the pinching is generated, the movement speed of the windowpane 11, and in conjunction with this, the rotation speed N of the motor 20 decrease (i.e., the rotational period lengthens). Because of this, the controller 31 constantly monitors a variation in the rotation speed N of the motor 20.

The controller 31 determines (detects) that the foreign object is pinched by the windowpane 11 if a calculated sum S (the cumulative sum of the rotation speed variation $\Delta N$), which is proportional to a load (a motor actuation load) that is applied to the motor 20, exceeds a pinching determination threshold T that has been set.

In the present specification, the calculated sum S that is calculated from the rotation speed variation $\Delta N$ and that is proportional to the load applied to the motor 20 will be referred to simply as a motor actuation load S below.

Since the variation in the rotation speed N is substantially proportional to the motor actuation load S, the cumulative sum of the rotation speed variation $\Delta N$ after a predetermined reference position or reference rotation speed in the course of the closing operation is reached, is referred to as the motor actuation load S in the present embodiment. That is, the motor actuation load S of the present embodiment corresponds to a rotation speed difference after the reference position or reference rotation speed is reached.

The motor actuation load S calculated in this manner, unlike an actual motor actuation load, tends to be smaller as the rotation speed N is made smaller in consequence of the load applied to the motor 20. In other words, the motor actuation load S becomes large when the rotation speed of the motor 20 is increased after the load applied to the motor 20 decreases, whereas it becomes small when the rotation speed is decreased after the load increases.

When the motor actuation load S becomes smaller than the pinching determination threshold T, the pinching is determined to be produced. In the present embodiment, the controller 31 corresponds to a pinching detecting means.

Additionally, the controller 31 determines whether a disturbance is applied to the motor 20 based on a variation in the rotation speed N when the motor 20 is accelerated. More specifically, vibration and an impact are applied to the motor 20, the windowpane 11 and the like while the door 10 is being opened/closed or the vehicle is running (particularly on the rough road). Due to this vibration and the like, external force is applied to the windowpane 11 in its opening/closing direction. The rotation speed of the motor 20 is decelerated/accelerated in the closing direction by this external force.

Generally, the disturbance while the vehicle is running on the rough road is applied to the windowpane 11 as the external force to move the windowpane 11 in its closing direction first, and subsequently in its opening direction.

The external force to move the windowpane 11 in its closing direction is applied in an opposite direction to the direction in which external force is applied when the foreign object is pinched. In the present embodiment, it is determined whether the disturbance is applied to the motor 20 based on the variation in the rotation speed N when the motor 20 is accelerated. More specifically, on the basis of the external force to move the windowpane 11 in its closing direction (i.e., external force to accelerate rotation of the motor 20), it is determined whether the disturbance is applied to the motor 20, so that the possibility that actual pinching is erroneously determined to be the disturbance can be decreased.

To be more precise, the controller 31 determines that the rotation of the motor 20 is decelerated when the rotation speed variation $\Delta N$ is smaller than a predetermined reference speed $-\Delta N_a$ ($\Delta N_a > 0$) (i.e., $\Delta N < -\Delta N_a$). The controller 31 determines that the motor 20 is rotated at a constant speed when the rotation speed variation $\Delta N$ is within the range of the reference speed $-\Delta N_a$ to $\Delta N_a$ (i.e., $-\Delta N_a \leqq \Delta N \leqq \Delta N_a$). The controller 31 determines that that the rotation of the motor 20 is accelerated when the rotation speed variation $\Delta N$ is larger than the reference speed $\Delta N_a$ (i.e., $-\Delta N_a < \Delta N$).

The reference speeds $-\Delta N_a$, $\Delta N_a$ are set in order that the rotation speed variation $\Delta N$ caused by the vibration in a normal operational state is not erroneously determined to be the disturbance. They are set by adding a certain margin to a fluctuation band of the rotation speed variation $\Delta N$ caused by the vibration in the normal operational state. While absolute values of the reference speeds $-\Delta N_a$, $\Delta N_a$ are the same in the present embodiment, they may be set differently.

The controller 31 has a disturbance detection counter to determine a degree of the disturbance. The controller 31 determines that the disturbance is applied to the motor 20 when a count value C of the disturbance detection counter becomes equal to or larger than a predetermined disturbance determination threshold $C_a$.

When the rotation of the motor 20 is determined to be accelerated, a first count value (8 in the present embodiment) is added to the count value C of the disturbance detection counter. When the rotation is determined to be decelerated, a second count value (1 in the present embodiment) is subtracted from the count value C. As well, a third count value (2 in the present embodiment) is subtracted from the count value C when the motor 20 is determined to be rotated at the constant speed.

Accordingly, a large value is added to the count value C of the disturbance detection counter when the rotation of the motor 20 is accelerated, a small value is subtracted from the count value C when the rotation is decelerated, and a value that is larger than this small value is subtracted from the count value C when the motor 20 is rotated at the constant speed.

By virtue of the above configuration, when the rotation of the motor 20 is repeatedly accelerated and decelerated during the disturbance, the count value C of the disturbance detection counter remains equal to or larger than the disturbance determination threshold $C_a$, so that it continues to be determined that the motor 20 is in a state of the disturbance.

When the motor 20 returns from the state of the disturbance to the normal operational state, in which the disturbance is not applied, the motor 20 is rotated at the constant speed. Thus, by repeatedly subtracting the third count value from the count value C, the count value C becomes smaller than the disturbance determination threshold $C_a$ relatively rapidly. Consequently, the motor 20 is determined to be in the normal operational state instead of the state of the disturbance.

In addition, the count value C is limited, such that it does not exceed an upper limit $C_{MAX}$ and that it is not below a lower limit 0 (zero).

The controller 31 of the present embodiment corresponds to a disturbance detecting means.

Furthermore, a method for setting the pinching determination threshold T that is employed in detecting the pinching in the state of the disturbance ($C \geq C_a$) is different from a method in the case of the normal operational state ($C < C_a$). As above, when the motor actuation load S becomes smaller than the pinching determination threshold T, the pinching is determined to be generated.

When it is determined that the rotation speed N is accelerated or does not change in the normal operational state, a correction value $S_{tha}$ for the normal operational state is subtracted from the motor actuation load S of that time. Then, the controller 31 sets the pinching determination threshold T at the result of this subtraction. That is, in the normal operational state, if the rotation speed N is not decelerated, the pinching determination threshold T is changed in accordance with the motor actuation load S of that time. Therefore, the pinching is determined based on a continuously decreased amount of the rotation speed N in the normal operational state.

The correction value $S_{tha}$ for the normal operational state is determined by adding a predetermined margin to a narrow fluctuation range, which is normally produced from sliding resistance, normal vibration and the like so as to restrict erroneous detection of the pinching.

On the other hand, in the state of the disturbance, every time the rotation speed N turns from the deceleration to the acceleration, a correction value $S_{thb}$ for the state of the disturbance is subtracted from the motor actuation load S of that time. The controller 31 sets the pinching determination threshold T at the result of this subtraction. The correction value $S_{thb}$ for the state of the disturbance is larger than the correction value $S_{tha}$ for the normal operational state. In other words, the controller 31 allows for the erroneous detection of the pinching in the state of the disturbance more than in the normal operational state.

In this manner, the pinching determination threshold T changes temporally according to the change of the rotation speed N and the motor actuation load S. By virtue of the margins (i.e., the predetermined correction values $S_{tha}$, $S_{thb}$) for the pinching determination threshold T in accordance with the temporally changing motor actuation load S, the possibility of the erroneous detection of the pinching as a consequence of the motor actuation load S being smaller than the pinching determination threshold T owing to the change of the rotation speed N due not to the pinching but to the disturbance can be decreased.

Accordingly, a load (a pinch load) used for a reverse operation when the pinching is detected is not made unduly large, and the pinching can be detected properly.

In addition, when the pinching is detected, the windowpane 11 is operated reverse to its closing operation, and is driven in its opening direction, thereby releasing the foreign object from a state of the pinching. In the present embodiment, the pinching determination threshold T is set according to the temporally changing rotation speed N and motor actuation load S. That is, in the state of the disturbance, the pinching determination threshold T is not set at a constant, but by an appropriate margin corresponding to the temporally changing motor actuation load S. Consequently, the possibility of an excessive pinch load in the case of the actual pinching can be decreased. The controller 31 of the present embodiment corresponds to a correcting means.

Next, with reference to FIGS. 3A to 5C, the pinching determination processing in the device 1 will be roughly described below.

Figure 3A:
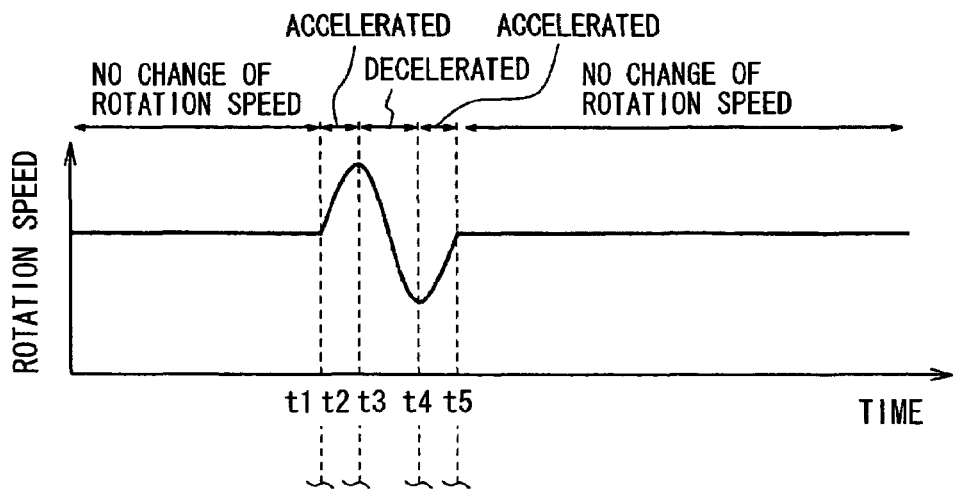
FIG. 3A is a diagram illustrating pinching determination processing in opening/closing a vehicle door.
Figure 3B:
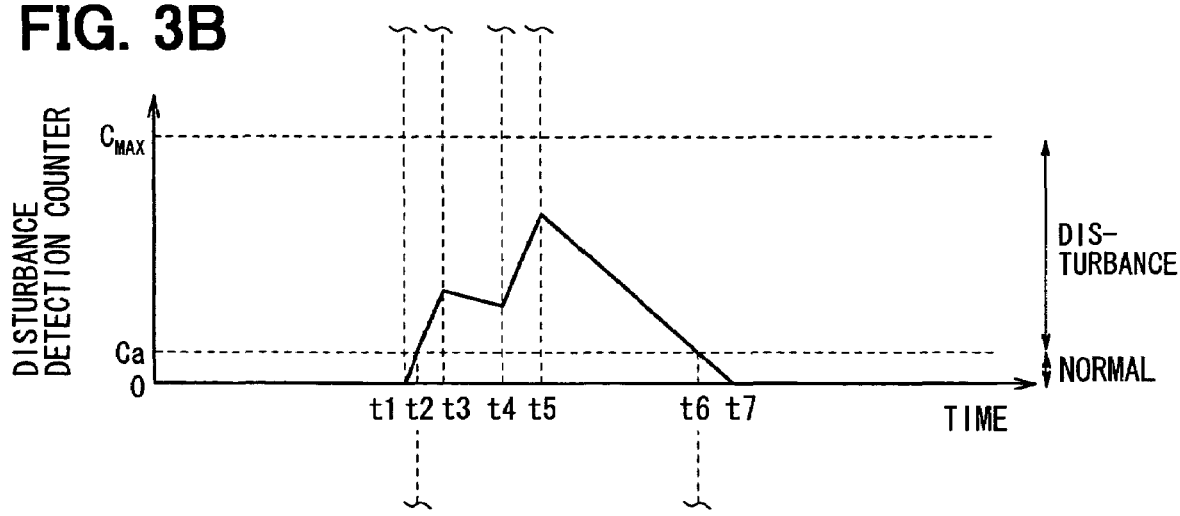
FIG. 3B is a diagram illustrating the pinching determination processing in opening/closing the vehicle door.
Figure 3C:
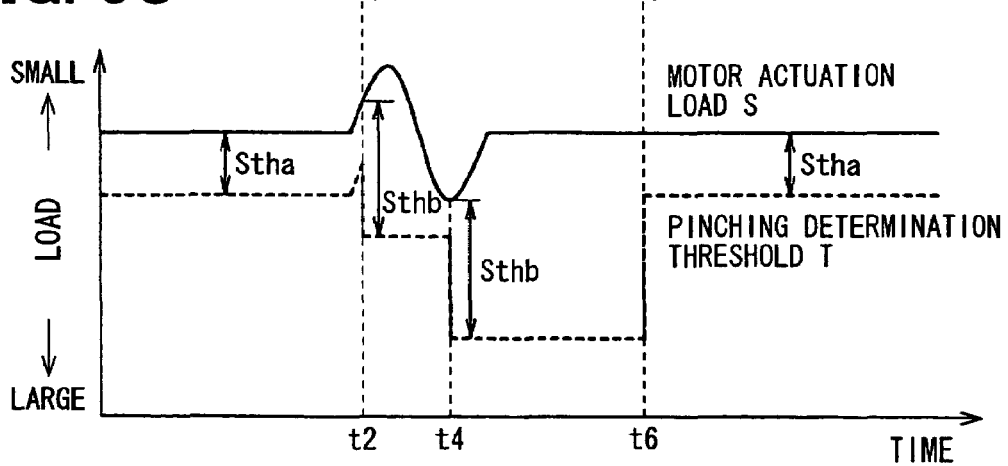
FIG. 3C is a diagram illustrating the pinching determination processing in opening/closing the vehicle door.

The pinching determination processing in the case where the vibration (disturbance) is applied to the motor 20 as a result of moving the door 10 from its opening to closing state while the windowpane 11 is being driven in its closing direction by actuating the motor 20, will be described with reference to FIGS. 3A to 3C. FIGS. 3A to 3C illustrate a state (e.g., in which the vehicle is running on a normal road, or the vehicle is stopped) except while the vehicle is running on the rough road.

As shown in FIG. 3A, the rotation speed N remains constant until a time t1. Then, the vibration is applied to the motor 20 as a result of closing the door 10 around the time t1. Consequently, the rotation speed N is accelerated from the time t1 to a time t3, decelerated from the time t3 to a time t4, accelerated from the time t4 to a time t5, and remains constant again after the time t5.

Meanwhile, as shown in FIG. 3B, the count value C of the disturbance detection counter remains 0 (zero) until the time t1. The rotation speed N is accelerated from the time t1 to the time t3, so that the large first count value (8) is added to the count value C on each detection of the pulse signal from the rotation detection device 27. From the time t3 to the time t4, the rotation speed N is decelerated, and thus the small second count value (1) is subtracted from the count value C on each detection of the pulse signal. The rotation speed N is accelerated from the time t4 to the time t5, so that the first count value (8) is added to the count value C again. After the time t5, the rotation speed N remains constant, and thus the medium third count value (2) is subtracted from the count value C. The count value C reaches 0 (zero) at a time t7, and the count value C remains 0 (zero) after the time t7.

In this manner, since the count value C temporally changes, the count value C reaches the disturbance determination threshold $C_a$ at a time t2 between the time t1 and the time t3, and at a time t6 between the time t5 and the time t7, the count value C reaches the disturbance determination threshold $C_a$.

That is, before the time t2 and after the time t6, the count value C is smaller than the disturbance determination threshold $C_a$, so that the rotation speed N is determined to be in the normal operational state (with no disturbance). On the other hand, the rotation speed N is determined to be in the state of the disturbance since the count value C is equal to or larger than the disturbance determination threshold $C_a$ from the time t2 to the time t6.

A period during which the rotation speed N is determined to be constant is so short around the time t3, t4, that the period during which the third count value is subtracted from the count value C of the disturbance detection counter is not illustrated in FIG. 3B.

FIG. 3C shows variations with time in the motor actuation load S (indicated with a continuous line) and the pinching determination threshold T (indicated with a dashed line). Until the time t2 and after the time t6, the rotation speed N is in the normal operational state, and accordingly the pinching determination threshold T, which is corrected using the correction value $S_{tha}$ for the normal operational state, is employed. The rotation speed N is in the state of the disturbance from the time t2 to the time t6, so that the pinching determination threshold T, which is corrected using the correction value $S_{thb}$ for the state of the disturbance, is employed.

In the normal operational state, if the rotation speed N is not decelerated (i.e., accelerated or constant), the pinching determination threshold T is set at the result of the subtraction of the correction value $S_{tha}$ for the normal operational state from the motor actuation load S, which is calculated from the rotation speed N of the time. Since there is not a period of the deceleration in the normal operational state as shown in FIG. 3A, the pinching determination threshold T is repeatedly set to follow the change of the motor actuation load S of the time constantly throughout the normal operational state.

In the state of the disturbance, on the other hand, at the time t2, at which the rotation speed N is determined to be in the state of the disturbance, the pinching determination threshold T is set at the result of the subtraction of the correction value $S_{thb}$ for the state of the disturbance from the motor actuation load S, which is calculated from the rotation speed N of the time. In an initial state of the disturbance, the pinching determination threshold T is set based on the motor actuation load S, which is calculated from the rotation speed N when its accelerating trend continues. Thus, because the pinching determination threshold T is set based on the rotation speed N that is increased to a certain extent, difference between the motor actuation load S and the pinching determination threshold T that is set can be limited to a small value, even during an initial phase of detection of the state of the disturbance. Hence, if the foreign object is pinched at this time, the pinching is detected (determined) with the rotation speed N being relatively large, thereby decreasing the pinch load (the load used for the reverse operation).

From the time t2 to the time t6, when the rotation speed N turns from the deceleration to the acceleration (i.e., at the time t4), that is, when the rotation speed N is reduced to a (local) minimum, the pinching determination threshold T is set at the result of the subtraction of the correction value $S_{thb}$ for the state of the disturbance from the motor actuation load S, which is calculated from the rotation speed N of that time.

In this manner, in the state of the disturbance, every time the rotation speed N is reduced to a local minimum, the pinching determination threshold T is updated in stages according to the motor actuation load S of that time. Consequently, the erroneous detection of the pinching can be limited, and the pinching determination threshold T can be constantly set by the appropriate margin in accordance with the actual change of the motor actuation load S, thereby decreasing the pinch load (the load used for the reverse operation) when the pinching is generated.

With reference to FIGS. 4A to 4C, the pinching determination processing when the windowpane 11 is driven in its closing direction by actuating the motor 20 while the vehicle is running on the rough road, will be described below.

As shown in FIG. 4A, although the vehicle is running on the normal road, and the rotation speed N does not change (or a negligible change) until a time t1, the rotation speed N is repeatedly accelerated and decelerated after the time t1. However, degrees and periods of the acceleration and deceleration are not constant.

As FIG. 4B illustrates, the count value C of the disturbance detection counter remains 0 (zero) until the time t1. The rotation speed N is accelerated from the time t1 to a time t3, so that the first count value is successively added to the count value C. From the time t3 to a time t4, the rotation speed N is decelerated, and thus the second count value is successively subtracted from the count value C. Although the rotation speed N turns from the deceleration to the acceleration at a time t5, it is determined that the rotation speed N does not change from the time t4 to a time t6 through the time t5 because the degrees of the deceleration and acceleration are small. Meanwhile, the third count value is successively subtracted from the count value C.

From the time t6 to a time t7 and from a time t8 to a time t10, the rotation speed N is accelerated, so that the first count value is added to the count value C. The rotation speed N is decelerated from the time t7 to the time t8 and from a time t11 to a time t12, and thus the second count value is subtracted from the count value C.

In addition, although the rotation speed N is accelerated from a time t9 to the time t10, the addition to the count value C is limited, since the count value C reaches the upper limit $C_{MAX}$ at the time t9. Besides, from the time t10 to the time t11, it is determined that the rotation speed N does not change. Meanwhile, the rotation speed N turns from the acceleration to the deceleration.

As well, it is determined that the rotation speed N does not change after the time t12. However, after the time t12, the rotation speed N turns from the deceleration to the acceleration at a time t13, although it changes relatively gently.

Because of the variation of the count value C, the count value C reaches the disturbance determination threshold $C_a$ at a time t2 between the time t1 and the time t3, and reaches the disturbance determination threshold $C_a$ again at a time t14 between the time t13 and a time t15. In other words, the rotation speed N is determined to be in the normal operational state until the time t2 and after the time t14, and to be in the state of the disturbance from the time t2 to the time t14.

Since the rotation speed N is in the normal operational state until the time t2 and after the time t14 as shown in FIG. 4C, the correction value $S_{tha}$ for the normal operational state is employed. The correction value $S_{thb}$ for the state of the disturbance is employed because the rotation speed N is in the state of the disturbance from the time t2 to the time t14.

At the time t2, the pinching determination threshold T is set at the result of the subtraction of the correction value $S_{thb}$ for the state of the disturbance from the motor actuation load S, which is calculated from the rotation speed N of the time.

From the time t2 to the time t14, the rotation speed N is reduced to a local minimum at the time t5, t8, t13, so that the pinching determination threshold T is set at the result of the subtraction of the correction value $S_{thb}$ for the state of the disturbance from the motor actuation load S, which is calculated from the rotation speed N of each one of the time t5, t8, t13.

Then, the rotation speed N turns to the normal operational state at the time t14, so that the pinching determination threshold T is set using the correction value $S_{tha}$ for the normal operational state. The rotation speed N does not change after the time t14, and thus the pinching determination threshold T is set at the result of the subtraction of the correction value $S_{tha}$ for the normal operational state from the motor actuation load S of the time.

FIGS. 5A to 5C shows an instance in which the pinching is caused in the case of FIGS. 4A to 4C, respectively. FIGS. 4A to 4C are true of FIGS. 5A to 5C respectively until a time t13. Dashed-dotted lines after a time t20 in FIGS. 5A to 5C, which follow continuous lines, indicate variations in FIGS. 4A to 4C, respectively.

The foreign object is pinched by the windowpane 11 at the time t20 between the time t13 and a time t14, and consequently the rotation speed N starts to be decelerated as shown in FIG. 5A. Although it is determined that the rotation speed N does not change from the time t13 to the time t20, the count value C of the disturbance detection counter is equal to or larger than the disturbance determination threshold $C_a$ during this period as shown in FIG. 5B, so that the rotation speed N is determined to be in the state of the disturbance.

The pinching determination threshold T at the time t20 remains a value, which is set at the time t13, at which the rotation speed N is reduced to a local minimum immediately before the time t20.

As the rotation speed N continues to be decreased after the time t20, the motor actuation load S, which is calculated from the rotation speed N, continues to be decreased. Then, the motor actuation load S reaches the pinching determination threshold T at a time t21. In response to this, the controller 31 determines (detects) that the pinching is generated.

On determining the pinching, the controller 31 reverses the motor 20 to release the foreign object, which is pinched by the windowpane 11, and controls the windowpane 11 to be opened by a predetermined distance. Alternatively, when the pinching is detected, the controller 31 may control the motor 20 to be stopped, so as not to close the windowpane 11 any further, to release the foreign object pinched by the windowpane 11.

Next, a flow of the pinching determination processing by the controller 31 will be described with reference to FIGS. 6 to 8. The controller 31 repeatedly performs this processing at predetermined time intervals.

To begin with, the controller 31 receives closing command signals (i.e., the normal and automatic closing command signals) from the operating switch 4, and then determines whether the motor 20 is driven in the closing direction (step S1).

If the motor 20 is not driven in the closing direction (step S1: No), there is no need for the pinching determination processing, so that the processing is immediately ended.

On the other hand, if the motor 20 is driven in the closing direction (step S1: Yes), the controller 31 determines whether the rotation detection device 27 inputs the pulse signal into the controller 31 (step S2).

If the pulse signal is not inputted into the controller 31 (step S2: No), the processing is immediately ended.

On the other hand, if the pulse signal is inputted into the controller 31 (step S2: Yes), the controller 31 calculates the rotation speed N of the motor 20 from an interval between this pulse signal and a pulse signal that is previously inputted (step S3).

As well as storing the latest rotation speed N as the rotation speed $N_0$ in a memory, the controller 31 stores a plurality of rotation speeds N (e.g., eight rotation speeds N) including this latest rotation speed $N_0$. Whenever the pulse signal is inputted into the controller 31, the controller 31 sequentially updates the memory with the latest plurality of rotation speeds N.

On calculating the rotation speed N, the controller 31 computes the rotation speed variation $\Delta N$ to be stored in the memory (step S4). In the present embodiment, the controller 31 sequentially updates the memory with the latest plurality of rotation speed variations $\Delta N$ as in the case of the rotation speed N. More specifically, the rotation speed variation $\Delta N$ is calculated by means of processing, in which the rotation speed N previously calculated and stored is subtracted from this latest rotation speed $N_0$. That is, the rotation speed variation $\Delta N$ corresponds to difference between the rotation speed N at the time the previous pulse signal is inputted, and the present rotation speed $N_0$.

On calculating the rotation speed variation $\Delta N$, the controller 31 computes the motor actuation load S to be stored in the memory (step S5). More specifically, this calculated rotation speed variation $\Delta N$ is added to the motor actuation load S that is stored so far. Accordingly, the cumulative sum of the rotation speed variation $\Delta N$ from a predetermined reference position is calculated. This calculated value (the cumulative sum) corresponds to difference (the variation) between the rotation speed N at the reference position and the present rotation speed $N_0$.

Then, the controller 31 determines whether the rotation of the motor 20 is accelerated in the closing direction (step S6). More specifically, it is determined whether the rotation speed variation $\Delta N$ that is calculated is larger than a predetermined reference speed $\Delta N_a$. That is, if the rotation speed variation $\Delta N$ is larger than the predetermined reference speed $\Delta N_a$, it is determined that the rotation of the motor 20 is accelerated in the closing direction.

If the rotation of the motor 20 is accelerated in the closing direction (step S6: Yes), the controller 31 adds the first count value (8 in the present embodiment) to the count value C of the disturbance detection counter, which is set in the memory (step S8).

On the other hand, if the rotation of the motor 20 is not accelerated in the closing direction (step S6: No), the controller 31 determines whether the rotation of the motor 20 is decelerated in the closing direction (step S7). More specifically, it is determined whether the rotation speed variation $\Delta N$ that is calculated is smaller than a predetermined reference speed $-\Delta N_a$. That is, if the rotation speed variation $\Delta N$ is smaller than the predetermined reference speed $-\Delta N_a$, it is determined that the rotation of the motor 20 is decelerated in the closing direction.

If the rotation of the motor 20 is decelerated in the closing direction (step S7: Yes), the controller 31 subtracts the second count value (1 in the present embodiment) from the count value C of the disturbance detection counter, which is set in the memory (step S9).

Meanwhile, if the rotation of the motor 20 is not decelerated in the closing direction (step S7: No), the controller 31 subtracts the third count value (2 in the present embodiment) from the count value C of the disturbance detection counter, which is set in the memory (step S10). That is, step S10 is carried out, if the rotation speed variation $\Delta N$ falls within a range between the predetermined reference speed $-\Delta N_a$ and the predetermined reference speed $\Delta N_a$, and the controller 31 determines that the rotation of the motor 20 does not change.

When the count value C of the disturbance detection counter is updated at step S8, S9, S10, the controller 31 determines whether the updated count value C is larger than the upper limit $C_{MAX}$ (step S11).

If the updated count value C is equal to or smaller than the upper limit $C_{MAX}$ (step S11: No), control skips step S12 and proceeds to step S13.

Meanwhile, if the updated count value C is larger than the upper limit $C_{MAX}$ (step S11: Yes), the count value C is set at the upper limit $C_{MAX}$ (step S12). By performing this processing, even if the rotation of the motor 20 continues to be accelerated for a long while, a unduly long-lasting period, during which the rotation speed N is determined to be in the state of the disturbance, can be restricted, since the count value C is limited to the upper limit $C_{MAX}$.

Because the correction value $S_{thb}$ for the state of the disturbance to calculate the pinching determination threshold T that is employed in the state of the disturbance is larger than the correction value $S_{tha}$ for the normal operational state to calculate the pinching determination threshold T that is employed in the normal operational state, the pinch load (the load used for the reverse operation) in the state of the disturbance is made larger than that in the normal operational state.

Furthermore, although the rotation speed N is determined to be in the state of the disturbance if the count value C is equal to or larger than the disturbance determination threshold $C_a$, the count value C can be promptly reduced below the disturbance determination threshold $C_a$ after the disturbance comes to an end, since the count value C is limited to the upper limit $C_{MAX}$.

Consequently, by the controller 31 rapidly shifting its determination of the rotation speed N to be in, from the state of the disturbance to the normal operational state after the disturbance applied to the motor 20 comes to an end, the possibility that the pinch load immediately after the motor 20 returns to the normal operational state is made as large as that in the state of the disturbance can be decreased.

Next, the controller 31 determines whether the updated count value C is smaller than the lower limit 0 (zero) (step S13).

If the updated count value C is equal to or larger than the lower limit 0 (zero) (step S13: No), control skips step S14 and proceeds to step S15.

On the other hand, if the updated count value C is smaller than the lower limit 0 (zero) (step S13: Yes), the count value C is set at the lower limit 0 (zero) (step S14). The count value C is limited to the lower limit 0 (zero) through this processing even if the rotation of the motor 20 continues to be decelerated for a long while with the pinching not being determined to be generated. Hence, the possibility of a long-lasting period, during which the rotation speed N is determined to be in the normal operational state despite the fact that the disturbance is applied to the motor 20 because the count value C is not equal to or larger than the disturbance determination threshold $C_a$, can be decreased.

Following this, the controller 31 determines whether the rotation speed variation ΔN is equal to or larger than the reference speed $-ΔN_a$ (i.e., whether the rotation speed N is accelerated or does not change) (step S15).

If it is determined that the rotation speed variation ΔN is smaller than the reference speed $-ΔN_a$ (step S15: No), control skips step S16 and proceeds to step S17.

Meanwhile, if it is determined that the rotation speed variation ΔN is equal to or larger than the reference speed $-ΔN_a$ (step S15: Yes), the controller 31 sets a reference motor actuation load $S_a$ for the normal operational state at the motor actuation load S of that time (step S16). Thus, the reference motor actuation load $S_a$ is not updated when the rotation speed N is decelerated.

After this, the controller 31 determines whether the count value C of the disturbance detection counter is smaller than the disturbance determination threshold $C_a$ (step S17). That is, it is determined whether the present state of the rotation speed N is in the state of the disturbance or not (i.e., in the normal operational state).

If the count value C of the disturbance detection counter is smaller than the disturbance determination threshold $C_a$ (step S17: Yes), the present state is in the normal operational state. Then, similar determination processing to that at step S15 is performed at step S18.

If it is determined that the rotation speed N is not decelerated at step S18 (step S18: Yes), the controller 31 sets a reference motor actuation load $S_b$ for the state of the disturbance at the motor actuation load S of that time at step S20. Accordingly, the reference motor actuation load $S_b$ for the state of the disturbance is updated in the normal operational state as well, and therefore the pinching determination threshold T can be set based on the motor actuation load S of that time, even during an initial phase of the change of the motor 20 from the normal operational state to the state of the disturbance.

Meanwhile, if it is determined that the rotation speed N is decelerated at step S18 (step S18: No), there is a possibility of the pinching, so that control skips step S20 and proceeds to step S21.

If the count value C of the disturbance detection counter is equal to or larger than the disturbance determination threshold $C_a$ (step S17: No), the rotation speed N is in the state of the disturbance, so that the controller 31 determines whether a state, in which the rotation speed N is decelerated or does not vary, has been changed into a state of the acceleration at step S19. In other words, it is determined whether the rotation speed variation ΔN, which is 0 (zero) or a negative quantity in the previous processing, turns into a positive quantity in this processing.

As another option, a predetermined threshold may be set in this determination processing. For example, setting the threshold at the above reference speed $ΔN_a$, it may be determined whether the rotation speed variation ΔN, which is not larger than the reference speed $ΔN_a$ in the previous processing, is larger than the reference speed $ΔN_a$ in this processing.

If the rotation speed N turns from the state, in which the rotation speed N is decelerated or does not vary, into the state of the acceleration (step S19: Yes), the reference motor actuation load $S_b$ for the state of the disturbance is updated at step S20. That is, if the rotation speed N turns from the deceleration (or the state where the rotation speed N does not vary) to the acceleration in the state of the disturbance, the reference motor actuation load $S_b$ for the state of the disturbance is updated.

On the other hand, if the rotation speed N does not turn from the state where the rotation speed N is decelerated or does not vary, into the state of the acceleration (step S19: No), control skips step S20 and proceeds to step S21.

At step S21, the controller 31 determines whether the present state of the rotation speed N is in the state of the disturbance or not (i.e., in the normal operational state) as in the case of step S17.

If it is determined that the present state is in the normal operational state (step S21: Yes), a reference motor actuation load $S_o$ is updated with the reference motor actuation load $S_a$ for the normal operational state (step S22).

Meanwhile, if it is determined that the present state is in the state of the disturbance (step S21: No), the reference motor actuation load $S_o$ is updated with the reference motor actuation load $S_b$ for the state of the disturbance (step S23).

Subsequently, at step S24, the controller 31 determines whether the present state of the rotation speed N is in the state of the disturbance or not (i.e., in the normal operational state) as in the case of step S17, S21.

If it is determined that the present state is in the normal operational state (step S24: Yes), a correction value $S_{th}$ is updated with the correction value $S_{tha}$ for the normal operational state (step S25).

On the other hand, if it is determined that the present state is in the state of the disturbance (step S24: No), the correction value $S_{th}$ is updated with the correction value $S_{thb}$ for the state of the disturbance (step S26).

Then, the controller 31 performs pinching determination at step S27. More specifically, it is determined whether the result (i.e., the pinching determination threshold T) of the subtraction of the correction value $S_{th}$ from the reference motor actuation load $S_0$ is larger than the motor actuation load S of that time. In this processing, if the motor actuation load S is equal to or larger than the pinching determination threshold T, it is not determined that the pinching is caused, whereas it is determined that the pinching is caused if the motor actuation load S is smaller than the pinching determination threshold T.

If it is determined that the pinching is caused (step S27: Yes), the controller 31 reverses the motor 20 in the opening direction so as to open the windowpane 11 in order that the foreign object pinched is released (step S28), and ends the processing.

Meanwhile, if it is not determined that the pinching is caused (step S27: No), control skips step S28 and the processing is ended.

As described above, the device 1 of the present embodiment estimates an extent of the state of the disturbance based on the rotation speed variation ΔN. Then, the rotation speed N is set in the normal operational state if the extent of the state of the disturbance is below a predetermined value (the disturbance determination threshold $C_a$), and if the extent of the state of the disturbance is equal to or larger than the predetermined value, the rotation speed N is set in the state of the disturbance.

The pinching determination threshold T is set according to the motor actuation load S in the normal operational state as well as in the state of the disturbance. Particularly in the state of the disturbance, the pinching determination threshold T is set based on the motor actuation load S at the time the rotation speed N turns to the acceleration. Accordingly, the possibility of the erroneous detection of the pinching can be decreased to a large degree, and the load used for the reverse operation can be reduced. Furthermore, since the correction value $S_{thb}$, which is larger than the correction value $S_{tha}$ for the normal operational state, is employed in the state of the disturbance in setting the pinching determination threshold T, the possibility of the erroneous detection of the pinching in the state of the disturbance is decreased.

Additionally, although it is determined whether the rotation speed N is in the normal operational state or not (i.e., in the state of the disturbance) according to the count value C of the disturbance detection counter in the above embodiment, the state of the disturbance may be divided into a plurality of stages according to the count value C. In this case, the correction values may be set differently in accordance with the extent of the state of the disturbance.

Besides, while the panel member control system of the present invention is applied to the power window device 1 for the vehicle in the above embodiment, it may be applied to overall apparatuses that open/close an opening/closing member, such as a sunroof opening/closing apparatus and a sliding door opening/closing apparatus.

Additional advantages and modifications will readily occur to those skilled in the art. The invention in its broader terms is therefore not limited to the specific details, representative apparatus, and illustrative examples shown and described.

What is claimed is:

1. A panel member control system for controlling a panel member that is driven in an opening direction to open an opening of an opening defining member and is driven in a closing direction to close the opening of the opening defining member, the panel member control system comprising:
   a motor that rotates in a first rotational direction in a first driven state to drive the panel member in the opening direction and rotates in a second rotational direction in a second driven state to drive the panel member in the closing direction;
   a rotation detecting means for detecting a rotational speed of the motor; and
   a pinching detecting means for detecting an occurrence of pinching of an object by the panel member when a pinching indicative value, which is obtained based on the rotational speed of the motor detected by the rotation detecting means at the time of driving the motor in the second driven state, exceeds a pinching determination threshold, wherein the pinching detecting means includes:
   a disturbance detecting means for determining whether the motor is in a disturbed state based on a change in the rotational speed of the motor, which is detected by the rotation detecting means during a period of acceleration of the rotational speed of the motor in the second driven state; and
   a correcting means for correcting the pinching determination threshold in view of a result of the determination made by the disturbance detecting means, wherein the correcting means corrects the pinching determination threshold based on the rotational speed of the motor, which is detected by the rotation detecting means when the correcting means senses a beginning of subsequent acceleration of the rotational speed of the motor in the second driven state after the result of the determination indicates that the motor is in the disturbed state.

2. The panel member control system according to claim 1, wherein the correcting means corrects the pinching determination threshold based on the rotational speed of the motor, which is detected by the rotation detecting means at the time the disturbance detecting means determines that the motor is in the disturbed state.

3. The panel member control system according to claim 1, wherein the correcting means corrects the pinching determination threshold based on the rotational speed of the motor, which is detected by the rotation detecting means at every beginning of acceleration of the rotational speed of the motor in the second driven state after the disturbance detecting means determines that the motor is in the disturbed state.

4. The panel member control system according to claim 1, wherein:
   the correcting means corrects the pinching determination threshold using a correction value, wherein the correction value includes a first correction value used when the motor is in the disturbed state, and a second correction value used when the motor is not in the disturbed state; and
   the correcting means returns the correction value from the first correction value to the second correction value, when the disturbance detecting means determines that the motor is no longer in the disturbed state.

5. The panel member control system according to claim 1, wherein the pinching detecting means detects the occurrence of the pinching of the object by the panel member, using a motor actuation load, which is calculated based on a change in the rotational speed of the motor.

6. A panel member control system for controlling a panel member that is driven in an opening direction to open an opening of an opening defining member and is driven in a closing direction to close the opening of the opening defining member, the panel member control system comprising:
   a motor that rotates in a first rotational direction in a first driven state to drive the panel member in the opening direction and rotates in a second rotational direction in a second driven state to drive the panel member in the closing direction;
   a rotation detecting means for detecting a rotational speed of the motor; and a pinching detecting means for detecting an occurrence of pinching of an object by the panel member when a pinching indicative value, which is obtained based on the rotational speed of the motor detected by the rotation detecting means at the time of driving the motor in the second driven state, exceeds a pinching determination threshold, wherein the pinching detecting means includes:

a disturbance detecting means for determining whether the motor is in a disturbed state, wherein: the disturbance detecting means determines that the motor is in the disturbed state when an acceleration count value exceeds a predetermined value;

the acceleration count value is incremented during a period of acceleration of the rotational speed of the motor in the second driven state; and the acceleration count value is decremented during a period of deceleration of the rotational speed of the motor in the second driven state; and a correcting means for correcting the pinching determination threshold in view of a result of the determination made by the disturbance detecting means.

7. The panel member control system according to claim 6, wherein the correcting means corrects the pinching determination threshold based on the rotational speed of the motor, which is detected by the rotation detecting means at the time the disturbance detecting means determines that the motor is in the disturbed state.

8. The panel member control system according to claim 6, wherein the correcting means corrects the pinching determination threshold based on the rotational speed of the motor, which is detected by the rotation detecting means at every beginning of acceleration of the rotational speed of the motor in the second driven state after the disturbance detecting means determines that the motor is in the disturbed state.

9. The panel member control system according to claim 6, wherein:

the correcting means corrects the pinching determination threshold using a correction value, wherein the correction value includes a first correction value used when the motor is in the disturbed state, and a second correction value used when the motor is not in the disturbed state; and the correcting means returns the correction value from the first correction value to the second correction value, when the disturbance detecting means determines that the motor is no longer in the disturbed state.

10. The panel member control system according to claim 6, wherein the pinching detecting means detects the occurrence of the pinching of the object by the panel member, using a motor actuation load, which is calculated based on a change in the rotational speed of the motor.

11. The panel member control system according to claim 6, wherein:

the acceleration count value is incremented by a first count value during the period of the acceleration of the rotational speed of the motor in the second driven state; and the acceleration count value is decremented by a second count value during the period of the deceleration of the rotational speed of the motor in the second driven state, wherein the first count value is larger than the second count value.

12. A panel member control system for controlling a panel member that is driven in an opening direction to open an opening of an opening defining member and is driven in a closing direction to close the opening of the opening defining member, the panel member control system comprising:

a motor that rotates in a first rotational direction in a first driven state to drive the panel member in the opening direction and rotates in a second rotational direction in a second driven state to drive the panel member in the closing direction;

a rotation detection device that detects a rotational speed of the motor; and a controller that controls rotation of the motor based on the rotational speed of the motor detected by the rotation detection device, wherein:

the controller detects an occurrence of pinching of an object by the panel member when a pinching indicative value, which is obtained based on the rotational speed of the motor detected by the rotation detection device at the time of driving the motor in the second driven state, exceeds a pinching determination threshold;

the controller determines whether the motor is in a disturbed state based on a change in the rotational speed of the motor, which is detected by the rotation detection device during a period of acceleration of the rotational speed of the motor in the second driven state; and the controller corrects the pinching determination threshold based on the rotational speed of the motor, which is detected by the rotation detection device, when the controller senses a shift from deceleration to acceleration in the rotational speed of the motor in the second driven state during the disturbed state.

13. The panel member control system according to claim 12, wherein: the controller corrects the pinching determination threshold using a correction value, wherein the correction value includes a first correction value used when the motor is in the disturbed state, and a second correction value used when the motor is not in the disturbed state; and the controller returns the correction value from the first correction value to the second correction value, when the controller determines that the motor is no longer in the disturbed state.

14. The panel member control system according to claim 12, wherein the controller detects the occurrence of the pinching of the object by the panel member, using a motor actuation load, which is calculated based on a change in the rotational speed of the motor.

15. The panel member control system according to claim 12, wherein: the controller determines that the motor is in the disturbed state when an acceleration count value exceeds a predetermined value; the acceleration count value is incremented during a period of acceleration of the rotational speed of the motor in the second driven state; and the acceleration count value is decremented during a period of deceleration of the rotational speed of the motor in the second driven state.

16. The panel member control system according to claim 12, wherein when the controller detects the occurrence of the pinching of the object by the panel member, the controller reverses the rotation of the motor to drive the panel member in the opening direction.

* * * * *